Oct. 25, 1932.    H. PHILIPP    1,884,200
METHOD OF CHLORINATING LIQUIDS
Filed March 25, 1929
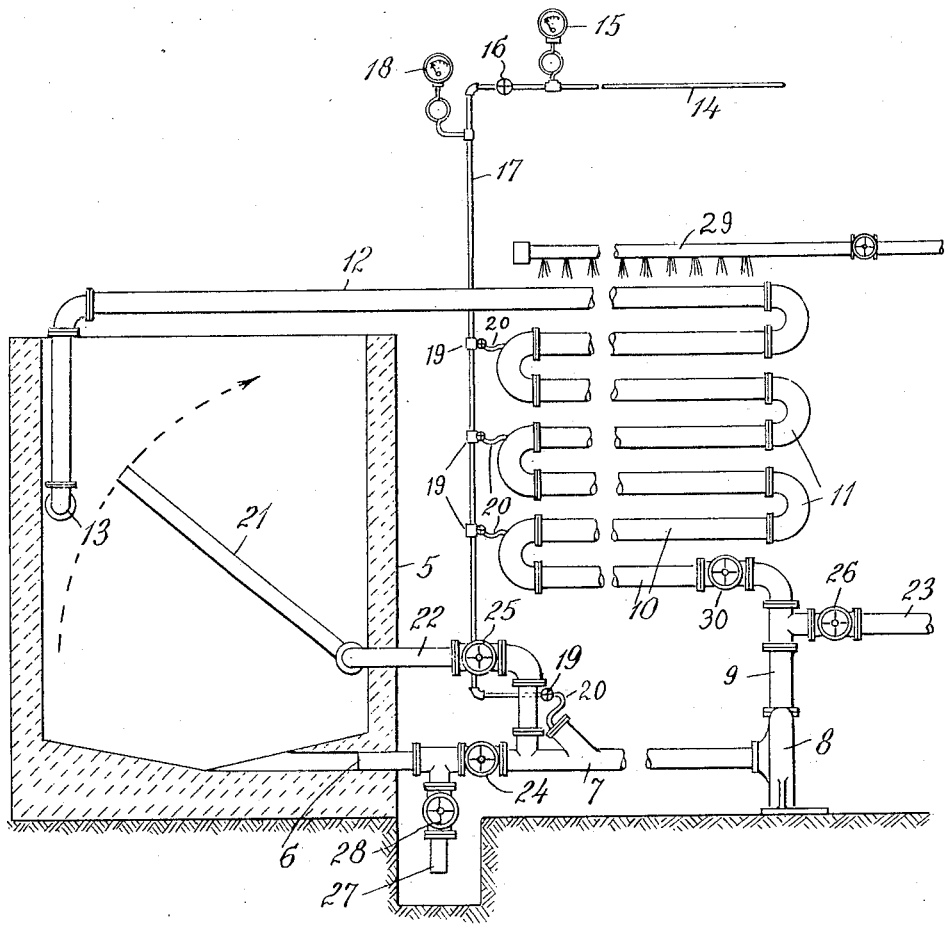
HERBERT PHILIPP
INVENTOR
BY Forbes Silsby
ATTORNEYS Patented Oct. 25, 1932

1,884,200

UNITED STATES PATENT OFFICE

HERBERT PHILIPP, OF SYRACUSE, NEW YORK, ASSIGNOR TO SOLVAY PROCESS COMPANY, OF SYRACUSE, NEW YORK, A CORPORATION

METHOD OF CHLORINATING LIQUIDS

Application filed March 25, 1929. Serial No. 349,691.

This invention relates to improved methods of chlorinating liquids. The invention is adapted particularly for the production of alkali metal and alkali earth metal salts of hypochlorous acid, but the procedure can be applied for other purposes, including the chlorination of organic liquids.

The alkali metal and alkali earth metal hydroxides react with chlorine quite readily to form corresponding hypochlorites. In the manufacture of calcium hypochlorite, for example, it is customary to pass chlorine into a circulating body of milk of lime (a water suspension of calcium hydroxide). A reservoir of milk of lime of predetermined content is prepared. The suspension is withdrawn from or near the bottom of the reservoir through a pipe including a pump which returns the liquid to the reservoir. At some point in the pipe, either before or after the pump, chlorine is introduced to the circulating liquid.

In the commercial manufacture of calcium hypochlorite solution, it is desirable to complete the reaction as rapidly as possible. The reaction involved is as follows:

(1) 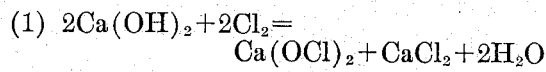
$$2Ca(OH)_2 + 2Cl_2 = Ca(OCl)_2 + CaCl_2 + 2H_2O$$

This reaction proceeds quite efficiently as long as an excess of calcium hydroxide is present. A deficiency in calcium hydroxide results in the following reaction:

(2) 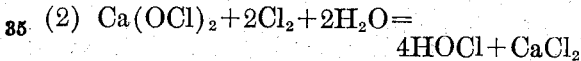
$$Ca(OCl)_2 + 2Cl_2 + 2H_2O = 4HOCl + CaCl_2$$

The result is called over-chlorination. The hypochlorous acid decomposes quite readily as follows:

(3) 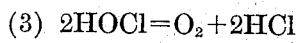
$$2HOCl = O_2 + 2HCl$$

After reaction (3) has taken place, a portion of the chlorine becomes unavailable, and it is clear that the favorable condition for promoting reaction (1) requires the intimate presence of calcium hydroxide in excess of the unreacted chlorine present. To prevent reactions (2) and (3), it is customary to use an excess of calcium hydroxide often as high as 10%.

Another method of preventing reactions (2) and (3) consists in decreasing the amount of chlorine supplied toward the end of the reaction. The latter method is not always practicable, and it is generally desirable to standardize the manufacturing operation and to leave as little as possible of the procedure to the judgment of relatively unskilled operators.

It is the object of the present invention to avoid the difficulties experienced heretofore in the chlorination of liquids, including the decomposition and loss of hypochlorous acid, and particularly to provide a simple and effective method of chlorinating liquids.

I have discovered that over-chlorination can be avoided readily without maintaining a considerable excess of the reacting material provided the chlorine is introduced in successive portions to the liquid at points spaced with reference to the travel thereof, so that reaction between the chlorine and the liquid undergoing chlorination which is in reactive contact with the chlorine is substantially completed before the succeeding portion of the chlorine is introduced thereto at the succeeding point. The object of the invention can be accomplished, therefore, for example by circulating the liquid to be chlorinated from a storage supply through a pipe system by means of a pump, and by introducing the chlorine to the pipe system in successive doses at spaced intervals in the pipe system. In conducting the operation in this manner, reaction (1) proceeds continuously in the pipe system and the amount of free chlorine present at any point therein is insufficient to promote reactions (2) and (3), and the loss of chlorine incident to such reactions is avoided.

In the practice of the method as applied particularly to the production of calcium hypochlorite, a body of milk of lime may be provided in a suitable reservoir as in the method heretofore used. The milk of lime may be withdrawn at or near the bottom of the reservoir and may be circulated by a pump through a pipe system. The arrangement of the pipes may vary, depending upon convenience of installation. They may be disposed vertically or horizontally, either above or below the level of the reservoir, and the liquid may travel in either direction therethrough. A convenient installation includes a plurality of pipes connected by elbows, so that the liquid passes through the pipes successively to provide a path of relatively slight cross-sectional area and of sufficient length in a minimum space. During the travel of the liquid through the pipe system, liquid chlorne is supplied from a suitable source thereof and is delivered at intervals to the liquid undergoing chlorination, for example, near the inlet to the pump and at one or more of the elbows in the pipe system. The number of inlets for chlorine will vary depending upon the conditions of operation and results to be obtained, and the spacing of such inlets will in turn depend upon the velocity of the liquid traveling through the pipe system. The liquid undergoing chlorination is returned to the reservoir. The return pipe dips preferably below the surface of the liquid in the reservoir and is ejected laterally to maintain a swirling motion which facilitates the maintenance of a suspension in the case of calcium hydroxide.

When the chlorination is completed, the liquid may be permitted to settle in the reservoir so that sludge and solid particles may separate. The clear liquid may be decanted then and pumped to storage receptacles. Alternatively separate settling receptacles may be employed, so that the chlorination apparatus may be used continuously. If sludge is separated from the bottom of the reservoir, it is removed through an outlet provided for that purpose before a fresh supply of liquid is introduced thereto.

The reaction may result in the evolution of heat sufficient to cause a partial decomposition, particularly if the concentration of calcium hypochlorite is in excess of 45 grams per liter. In that event it is desirable to cool the circulating liquid. This may be accomplished by permitting water to flow over the pipes through which the liquid circulates as in an atmospheric condenser. A double pipe condenser or other suitable cooling arrangement may be employed. The amount of cooling will be adjusted to maintain an even temperature in the system.

The method is suitable for the manufacture of sodium hypochlorite of very high available chlorine content, such as is used in the laundry trade. In such operation, a solution of caustic soda is treated with chlorine and considerable heat is evolved. In that case, additional cooling may be required and may be secured by introducing a tubular heat interchanger between a point where chlorine is introduced and a successive point of introduction of additional chlorine. The method can be used also for the chlorination of organic liquids, for instance in the manufacture of monochlorobenzol. In connection with such operations, catalysts can be employed in the circulating system.

While liquid chlorine is used preferably in the production of hypochlorites of alkali and alkali earth metals, I have found it desirable to use chlorine in gaseous form when treating organic liquids. Gaseous chlorine may, however, be utilized in any of the operations described herein.

The amount of chlorine introduced to the system may be regulated as desired, the same or varying amounts being added at different points in the system. The chlorination can be completed in a single passage of the liquid through the pipe system, or it may be recirculated. In the latter case, a return pipe to the reservoir is required, while in the former, the liquid after passing through the pipe system, may be delivered directly to a separate receptacle. When the chlorination is to be completed by a single pass of the liquid through the pipe system, it has been found desirable to regulate the portions of the chlorine introduced at the different points in such a manner that they are in decreasing amounts from feed point to feed point in the direction of the flow. By operating in this manner, the chlorine available for reaction is decreased in quantity as the concentration or total amount of the material available for reaction with the chlorine decreases. Operation by this method is substantially continuous, fresh liquid being supplied constantly to the reservoir to maintain a suitable body thereof.

The invention will be more clearly understood by reference to the accompanying drawing, which illustrates a preferred embodiment of an apparatus adapted for the production of calcium hypochlorite.

Referring to the drawing, 5 indicates a reservoir of concrete or other suitable material adapted to receive a supply of milk of lime. An outlet pipe 6 at the bottom of the reservoir delivers the milk of lime to a pipe 7 which is connected to a pump 8. The latter delivers the liquid to a pipe 9 which is connected to a pipe system including a plurality of pipes 10 connected by elbows 11. A return pipe 12 receives the liquid from the system and delivers it through a laterally projecting nozzle 13 to the reservoir. The liquid is thus circulated at a suitable velocity through the pipe system.

A pipe 14 is connected to a source of chlorine, preferably liquid, and is provided with a manometer 15 which indicates the pressure in the pipe. A valve 16 controls the flow of liquid chlorine to a pipe 17 having a manometer 18. The latter manometer enables the operator to set the valve 16 so as to permit the delivery of the chlorine at a uniform pressure to the system. Pipe 17 is provided with outlets controlled by valves 19 which are connected by flexible pipes 20 to the pipe 7 and to one or more of the elbows 11, so that the chlorine is delivered to the circulating liquid at spaced points which permit substantial reaction of each dose of chlorine with the circulating liquid before the successive dose is introduced. The amount of chlorine thus introduced and the number of doses employed may be controlled by valves 19.

When the chlorination is completed, the liquid may be permitted to settle in the reservoir 5 as hereinbefore described. The supernatant liquid may be decanted then through a hinged pipe 21 and outlet pipe 22 which is connected with the pipe 7. It may be discharged then through pump 8 and a pipe 23 which is connected to the pipe 9. Valves 24, 25, 26 and 30 are provided to permit the operation described, the valves 25 and 26 being normally closed while the valves 24 and 30 are open, the latter valves being closed when the valves 25 and 26 are open. A sludge outlet 27, controlled by a valve 28, is connected to the outlet 6, so that solid materials which settle in the reservoir can be flushed therefrom before a fresh supply of liquid is introduced.

If cooling is required to avoid excessive temperatures in the pipe system, it may be effected by water delivered from a pipe 29. The water is sprayed over the pipe system. Any other suitable cooling means may be utilized.

The method and particularly the apparatus as described are subject to numerous variations, as hereinbefore indicated, and such changes may be made without departing from the invention, which embodies the idea of supplying successive doses of chlorine to the liquid in such a manner as to avoid over-chlorination and the necessity for maintaining a substantial excess of the material to be reacted with the chlorine, at the zone or zones of reaction, though in the operation as described, a slight excess above that required to react with the final dose of chlorine should be present in order that none of the chlorine may be lost through failure to react with the desired material or the decomposition of the hypochlorite in the solution.

It is, of course, obvious to one skilled in this art, that the travel of the liquid from one point of introduction of chlorine to another point where a succeeding portion of chlorine is introduced may be accomplished in manners other than as described above. For example, the chlorine may be introduced at a plurality of points into the liquid contained in a tank and the liquid may be circulated therein by suitable means such as a propeller or by injection of the chlorine into the liquid.

I claim:

1. The method of chlorinating liquids which comprises causing the liquid to traverse an extended path of relatively slight cross-sectional area and introducing chlorine to the liquid at a plurality of points spaced with reference to the path of travel so that the chlorine introduced at each point is consumed substantially before the liquid which was in reactive contact therewith arrives at the succeeding point of introduction of the chlorine.

2. The method of chlorinating liquids which comprises recirculating the liquid from a source of supply through an extended path of relatively slight cross-sectional area back to the source of supply, and introducing chlorine to the liquid at a plurality of points spaced with reference to the path of travel so that the chlorine introduced at each point is consumed substantially before the liquid which was in reactive contact therewith arrives at the succeeding point of introduction of the chlorine.

3. The method of chlorinating alkaline liquids which comprises causing the liquid to traverse an extended path of relatively slight cross sectional area and introducing chlorine to the liquid at a plurality of points spaced with reference to the path of travel so that the chlorine introduced at each point substantially completely reacts with the liquid in reactive contact therewith to form a hypochlorite before the liquid arrives at the succeeding point of introduction of the chlorine.

4. The method of chlorinating milk of lime which comprises recirculating the milk of lime from a source of supply through an extended path of relatively slight cross sectional area back to the source of supply and introducing chlorine to the circulating milk of lime at a plurality of points spaced with reference to the path of travel so that the chlorine introduced at each point substantially completely reacts with the milk of lime to form calcium hypochlorite before the recirculating milk of lime arrives at the succeeding point of introduction of the chlorine.

I witness whereof I have hereunto set my hand.

HERBERT PHILIPP.